US009628386B2

(12) United States Patent
Bortoloso et al.

(10) Patent No.: US 9,628,386 B2
(45) Date of Patent: Apr. 18, 2017

(54) METHOD OF DISPATCHING APPLICATION MESSAGES

(75) Inventors: Luca Antonio Bortoloso, Genoa (IT); Guido Giuffrida, Genoa (IT); Isabella Roncagliolo, Genoa (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1355 days.

(21) Appl. No.: 12/565,921

(22) Filed: Sep. 24, 2009

(65) Prior Publication Data

US 2010/0082817 A1  Apr. 1, 2010

(30) Foreign Application Priority Data

Sep. 26, 2008 (EP) .................. 08016962

(51) Int. Cl.
*G06F 15/173* (2006.01)
*G06F 11/00* (2006.01)
(Continued)

(52) U.S. Cl.
CPC ......... *H04L 47/10* (2013.01); *G06F 9/546* (2013.01); *H04L 47/19* (2013.01); *H04L 47/20* (2013.01);
(Continued)

(58) Field of Classification Search
CPC ........... H04L 29/08171; H04L 12/5695; H04L 47/10; H04L 43/00; H04L 47/32; H04L 47/2441; H04L 12/5693
(Continued)

(56) References Cited

U.S. PATENT DOCUMENTS 5,367,523 A  11/1994 Chang et al.
6,014,707 A  1/2000 Miller et al.
(Continued)

FOREIGN PATENT DOCUMENTS

WO  02101960 A1  12/2002

OTHER PUBLICATIONS

Feng, Wu-chang, et al., "The Bue Active Queue Management Algorithms," IEEE/ACM Transactions on Metworking, vol. 10, No. 4, pp. 513-528, Aug. 2002.

*Primary Examiner* — Tonia L Dollinger
*Assistant Examiner* — Kishin G Belani
(74) *Attorney, Agent, or Firm* — Laurence Greenberg; Werner Stemer; Ralph Locher

(57) ABSTRACT

A method for dispatching a plurality of messages incoming into a dispatching server, each incoming message being issued by a source application and targeted to at least a destination application, the source application, the destination application and the dispatching server residing within a server-client network. The method includes the steps of defining a maximum rate of incoming messages per second, choosing an appropriate message rate reduction policy out of a first and of a second message rate reduction policy, starting a process which periodically determines a current rate of incoming messages per second, dispatching the message in case the current rate is smaller than the maximum rate, activating the appropriate message rate reduction policy in case the current rate of incoming messages is higher than the maximum rate, monitoring a result of the process and adapting a totality of parameters for the appropriate message rate reduction in case the current rate of incoming messages has dropped below the maximum rate.

2 Claims, 1 Drawing Sheet

(51) Int. Cl.
*H04L 12/28* (2006.01)
*G06F 15/16* (2006.01)
*H04L 12/66* (2006.01)
*H04L 12/801* (2013.01)
*G06F 9/54* (2006.01)
*H04L 12/813* (2013.01)
*H04L 12/825* (2013.01)
*H04L 12/823* (2013.01)

(52) U.S. Cl.
CPC ............ *H04L 47/263* (2013.01); *H04L 47/32* (2013.01); *Y02B 60/31* (2013.01)

(58) Field of Classification Search
USPC ........................................................ 709/226
See application file for complete search history.

(56) References Cited

U.S. PATENT DOCUMENTS

| | | |
|---|---|---|
| 6,704,323 B1 * | 3/2004 | Von Der Straten ............ 370/463 |
| 6,868,061 B1 | 3/2005 | Kilkki et al. |
| 7,792,036 B2 * | 9/2010 | Clemm et al. ................. 370/235 |
| 2003/0009560 A1 | 1/2003 | Venkitaraman et al. |
| 2005/0039103 A1 | 2/2005 | Azenko et al. |
| 2007/0115848 A1 * | 5/2007 | Chean et al. .................. 370/252 |
| 2007/0127491 A1 * | 6/2007 | Verzijp et al. .............. 370/395.2 |
| 2007/0130255 A1 * | 6/2007 | Wolovitz et al. ............. 709/204 |
| 2008/0013462 A1 * | 1/2008 | Ye et al. ....................... 370/252 |
| 2008/0198746 A1 | 8/2008 | Kwan et al. |
| 2009/0122705 A1 * | 5/2009 | DeVal et al. .................. 370/235 |
| 2010/0002584 A1 * | 1/2010 | Jalali ............................. 370/235 |

* cited by examiner

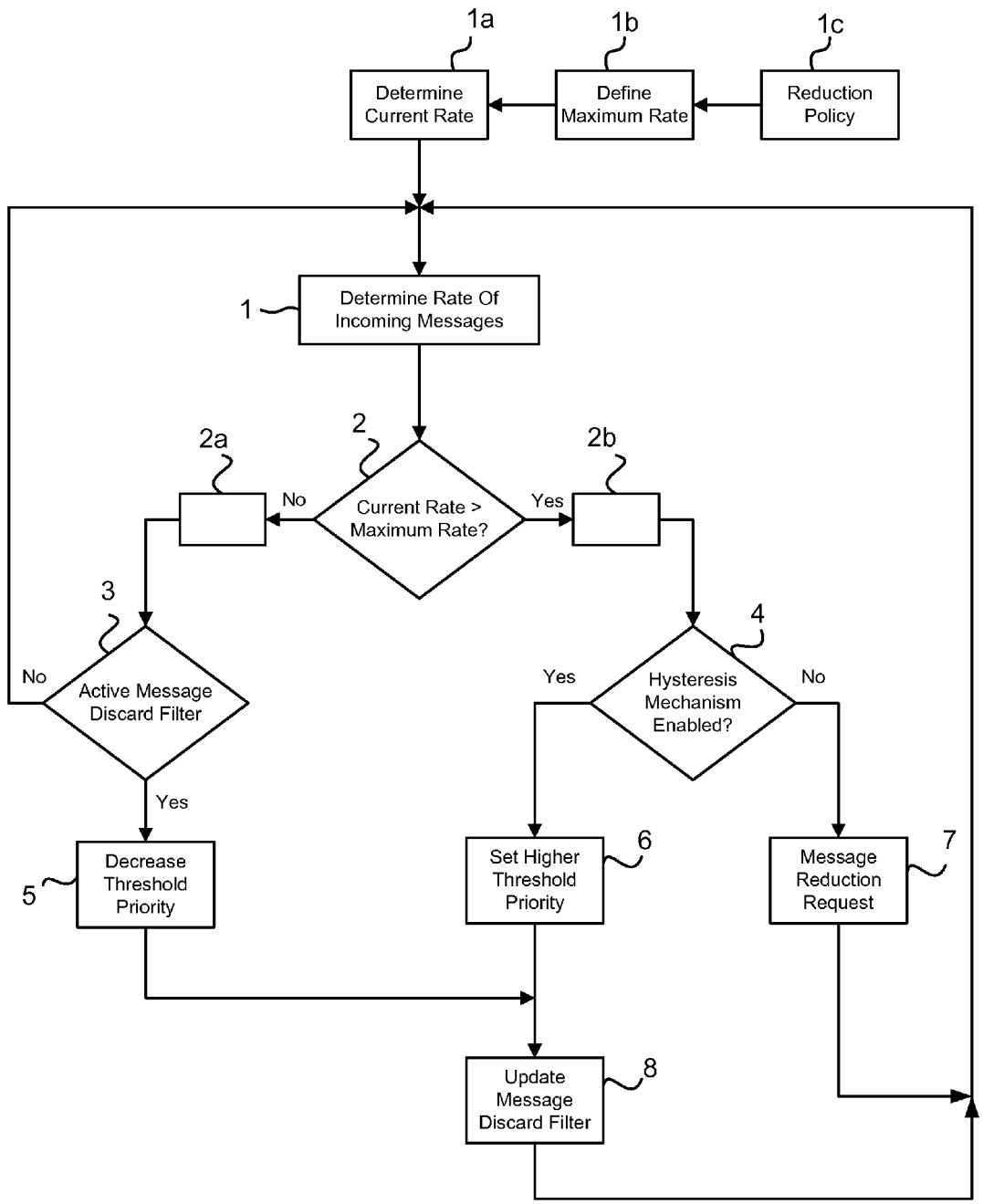

METHOD OF DISPATCHING APPLICATION MESSAGES

CROSS-REFERENCE TO RELATED APPLICATION

This application claims the priority, under 35 U.S.C. §119, of European patent application EP 08 016 962.6, filed Sep. 26, 2008; the prior application is herewith incorporated by reference in its entirety.

BACKGROUND OF THE INVENTION

Field of the Invention

The invention relates to a method for dispatching application messages, in particular in a system based on server-client communication with a manufacturing execution system (MES). In particular, the data handling routines and messaging rules and protocol are determined in the ISA-95 standard, which is herewith incorporated by reference.

In a wide range of software architectures and in particular in MES environments, there are many applications which produce messages. Especially in a case of distributed applications in a complex network, a task of managing an overall messaging between these applications is very demanding, as an important amount of a network bandwidth has to be allocated for the messaging. In some cases the task becomes critical, for example:

in case a connection is lost, the distributed applications affected by the connection loss may not receive important messages.

an inappropriately designed application or an application with non-optimized settings may produce a wide number of messages, a fact which may lead to a congestion of the entire network.

The term "message," as used herein, is understood as to cover a totality of control and status data, for example log messages, events, warnings, errors, notifications.

SUMMARY OF THE INVENTION

It is accordingly an object of the invention to provide a method for dispatching application messages which overcomes the above-mentioned disadvantages of the heretofore-known devices and methods of this general type and which improves the stability and the reliability of the network in terms of network failure, network congestion meaning limiting a message traffic of certain clients or applications and lost messages due to a broken-down connection.

With the foregoing and other objects in view there is provided, in accordance with the invention, a method of dispatching a plurality of messages incoming into a dispatching server, each incoming message being issued by a source application and targeted to at least a destination application, the source application, the destination application, and the dispatching server residing within a server-client network, the method which comprises the following steps:

a) defining a maximum rate of incoming messages per unit time (e.g., per second);

b) choosing an appropriate message rate reduction policy out of a plurality of message rate reduction policies, including a first message rate reduction policy and of a second message rate reduction policy;

c) starting a process to periodically determine a current rate of incoming messages per unit time;

d) dispatching the message if the current rate is smaller than a maximum rate;

e) activating the appropriate message rate reduction policy if the current rate of incoming messages is higher than the maximum rate; and f) monitoring a result of the process and adapting a totality of parameters for the appropriate message rate reduction in case the current rate of incoming messages has dropped below the maximum rate.

The main advantage of the present invention is an improvement in the stability and in the reliability of the network by providing an effective way to dispatch the messages, giving the possibility to develop complex business legacy logics and at the same time managing a configuration thereof during critical network traffic phases by auto-detecting suitable steps to be taken in order to insure a continuous traffic flow and an optimum network load balance.

In accordance with an added feature of the invention, the first message rate reduction policy applies a hysteresis mechanism by carrying out the following steps:

i. discarding the incoming message if a priority of the incoming message is lower than a default threshold priority;

ii. notifying the source application about the discarding of the incoming message and providing to the source application a current message discarding filter;

iii. determining a new current incoming message rate;

iv. checking if the new current rate has decreased below the maximum rate;

v. increasing the default threshold priority to a new threshold priority in case the new current rate is higher than the maximum rate;

vi. decreasing the new threshold priority in case the new current rate is lower than the maximum rate;

vii. sending an updated message discarding filter to the source application and restarting at step i.

In accordance with an added feature of the invention, the second message rate reduction policy periodically requests a message number reduction from the source application by broadcasting an event to the source application, the event containing a number of messages to be discarded by said source application, the request being broadcasted until the current rate of incoming messages has decreased below the maximum rate.

In accordance with an added feature of the invention, the step of dispatching the incoming message is carried out after the message has been backed up and after an availability of a connection to the destination application has been acknowledged.

In accordance with an additional feature of the invention, if the connection is unavailable, the message is labelled as pending and dispatched as soon as the connection has been re-established.

In accordance with another feature of the invention, the method further comprises allowing a temporary overshoot of the current rate over the maximum rate without activating the appropriate message rate reduction policy.

In accordance with a further feature of the invention, the temporary overshoot is activated at run-time of the dispatching server based on a user setting of one of the following parameters: period of overshoot time, maximum overload rate, the period of overshoot time in combination with the maximum overload rate.

In accordance with yet an added feature of the invention, a security checking entity compares a sum of an actual network load and an additional network load generated by the user setting with a total network capacity and issues a warning message, in case the user setting overloads the total network capacity, the warning being issued before the temporary exceeding with the parameter is activated.

In accordance with again an added feature of the invention, the maximum rate of incoming messages and the appropriate message rate reduction policy is altered at run-time of the dispatching server.

With the above and other objects in view there is also provided, in accordance with the invention, a user interface, a data communication interface, a network protocol manager, and a message storage entity—commonly configured for implementing the method according to claim 1.

In accordance with a concomitant feature of the invention, there is further provided a deployable library containing routines to be embedded in the source application in order to define a required application-side message discarding policy.

Other features which are considered as characteristic for the invention are set forth in the appended claims.

Although the invention is illustrated and described herein as embodied in a method for dispatching of application messages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a block-diagrammatic flowchart of a message dispatching procedure according to the invention.

DETAILED DESCRIPTION OF THE INVENTION

Referring now to the sole FIGURE of the drawing in detail, there is shown a message dispatching procedure according to the invention. In a first step 1*b*, a maximum rate of incoming messages per second is defined and an appropriate message rate reduction policy is chosen 1*c*. In a second step, a process which periodically determines a current rate of incoming messages is started 1*a*. In a third step 1, the current rate of incoming messages per second is determined. In a fourth step 2, it is checked if the current rate is higher than a predefined maximum rate of incoming messages per second. In other words the maximum rate defines a maximum allowable rate of incoming messages per second.

If the current rate is not higher than the maximum rate the message is dispatched to the destination application and subsequently it is further checked 3 if there is an active message discarding filter. If there is no active message discarding filter, the procedure returns to the third step. If there is an active message discarding filter present, a threshold priority is decreased 5. In other words, the procedure has determined that it can readapt the filter in order to re-allow higher priority messages to be dispatched, because the current rate is allowable. After decreasing 5 the threshold priority, the procedure sends 8 an updated message discarding filter to the source application and returns to the third step 1.

If in the fourth step the procedure has determined that the current rate is higher than the maximum rate, the appropriate message rate reduction as chosen in 1*c* is activated 2*b* and subsequently it is further checked 4 if a hysteresis mechanism is enabled 4, in other words if the first policy has been chosen. If the second message rate reduction policy has been chosen, thus the hysteresis mechanism is disabled, the procedure broadcasts 7 an event to the source application in order to direct said source application to reduce its total message transmission by a certain number of messages. If the first message rate reduction policy has been chosen, thus the hysteresis mechanism is active, a new, higher threshold priority is set 6. Subsequently, the procedure sends 8 the updated message discarding filter to the source application and returns to the third step.

It is noted that the term high threshold priority is used in the sense that high priority messages may be filtered as well as low priority messages. On the contrary, a low threshold priority means that only the low priority messages are filtered. Thus, increasing the threshold priority results in an increased number of discarded messages and decreasing the threshold priority results in a decreased number of discarded messages.

Preferably, the first message rate reduction policy applies a hysteresis mechanism by carrying out the steps of:
  discarding the incoming message if a priority of the incoming message is lower than a default threshold priority,
  notifying the source application about the discarding of the incoming message and providing to the source application a current message discarding filter,
  determining (1) a new current incoming message rate,
  checking (2) if the new current rate has decreased below the maximum rate,
  increasing (6) the default threshold priority to a new threshold priority in case the new current rate is higher than the maximum rate,
  decreasing (5) the new threshold priority in case the new current rate is lower than the maximum rate,
  sending (8) an updated message discarding filter to the source application and restarting at the first step ("discarding").

The hysteresis mechanism advantageously allows a prediction of the new threshold priority by taking into account a history of the message dispatching. In other words, taking as example a case where the new threshold priority is very high and for several iterating steps the current rate has been found to be every time lower than the maximum rate, the new threshold priority will be decreased in every step until a minimum priority is reached, instead of decreasing the new threshold priority only after the first iterating step and keeping it the same after the second and the third iterating step. A further advantage of the first policy is that the determination of the current rate is very precise due to the fact that it is carried out on the dispatching server and thus, measurement variations due to client specific tasks are avoided.

Preferably, the second message rate reduction policy periodically requests a message number reduction from the source application by broadcasting 7 an event to the source application, the event containing a number of messages to be discarded by said source application, the request being broadcasted 7 until the current rate of incoming messages has decreased below the maximum rate. Advantageously, the second policy allows an effective control of the message dispatching at the source application side, thus allowing the source application to decide itself which type of messages are most unimportant and can be discarded. In other words, as the dispatching server has no knowledge of internals of the source application, it eventually would discard messages with a low priority which nevertheless are important for a certain client notification.

The dispatching of the incoming message is carried out after the message has been backed up and after an availability of a connection to the destination application has been acknowledged. Upon unavailability of the connection, the message is labelled as pending and is dispatched as soon as the connection has been re-established. Advantageously, this increases a reliability of the dispatching by ensuring that no messages get lost in case of a connection failure. Thus, the client will still receive the message as soon as the connection has been repaired.

A temporary exceeding of the maximum rate by the current rate is being allowed without activating the appropriate message rate reduction policy. This advantageously increases a flexibility of the dispatching by allowing message rate peaks for a limited period of time. For example, in case the network carries a low data traffic but a high message traffic, less messages have to be discarded as a result of an allowable total network capacity.

The temporary exceeding is activated at run-time of the dispatching server based on a user setting of one of parameters: period of exceeding time, maximum overload rate, the period of exceeding time in combination with the maximum overload rate. The maximum overload rate determines an extreme of allowable message traffic, higher than the maximum rate which itself is preferably chosen as to keep a security margin for a traffic load. Advantageously, the user has three options for constraining in an appropriate way the temporary exceeding of the maximum rate.

Preferably, a security checking entity compares a sum of an actual network load and an additional network load generated by the user setting with the total network capacity and issues a warning message, in case the user setting overloads the total network capacity, the warning being issued before the temporary exceeding with the parameter is activated. This advantageously increases a security by backing up a user's choice with an automated check of relevant parameters like said total network capacity, said additional network load and said actual network load. Thus, in case the user setting surpasses allowable values, the security checking entity signals the warning message and the user setting is adjusted in advance of a possible network overload.

The maximum rate of incoming messages and the appropriate message rate reduction policy is altered at run-time of the dispatching server. This advantageously allows a further increase in flexibility by making it possible to adapt to new network conditions in a fast way.

A preferred embodiment of the present invention comprises a user interface, a data communication interface, a network protocol manager and a message storage entity.

The embodiment further comprises a deployable library containing routines to be embedded in the source application in order to define a required application-side message discarding policy. Especially in case the second policy has been chosen, it is preferable that, beside the broadcasting 7 of the event to the source application, the dispatching server sends along a set of suggested discarding policies for the source application in form of the library. Preferably, the library is embedded into the source application such that in case the current rate is higher than the maximum rate, said library discards the message before a transmission without altering the internals of the source application.

The invention claimed is:

1. A module comprising a user interface, a data communication interface, a network protocol manager, and a message storage entity commonly configured for implementing a method of dispatching a plurality of messages incoming into a dispatching server, each incoming message being issued by a source application and targeted to at least a destination application; the source application; the destination application, and the dispatching server residing within a server-client network, the method which comprises the following steps:
   a) defining a maximum rate of incoming messages per unit time;
   b) choosing a message rate reduction policy;
   c) starting a process to periodically determine a current rate of incoming messages per unit time;
   d) dispatching the message if the current rate is smaller than a maximum rate;
   e) activating the message rate reduction policy if the current rate of incoming messages is higher than the maximum rate, wherein the message rate reduction policy applies a hysteresis mechanism by carrying out the following steps:
      i. discarding one of the incoming messages if a priority of the one of the incoming message is lower than a default threshold priority;
      ii. notifying the source application about the discarding of the one of the incoming messages and providing to the source application a current message discarding filter;
      iii. determining a new current incoming message rate;
      iv. checking if the new current rate has decreased below the maximum rate;
      v. increasing the default threshold priority to a new threshold priority in case the new current rate is higher than the maximum rate of incoming messages per unit time;
      vi. decreasing the new threshold priority in case the new current rate is lower than the maximum rate of incoming messages per unit time;
      vii. sending an updated message discarding filter to the source application and restarting at step i; and
   f) monitoring a result of the process and adapting a totality of parameters for the message rate reduction in case the current rate of incoming messages has dropped below the maximum rate.

2. The module according to claim 1, further comprising a deployable library containing routines to be embedded in the source application in order to define a required application-side message discarding policy.

* * * * *